US012100344B1

(12) United States Patent
Yun et al.

(10) Patent No.: US 12,100,344 B1
(45) Date of Patent: Sep. 24, 2024

(54) METHOD FOR COMPENSATING COLOR CHANGE DUE TO TEMPERATURE RISE OF LED DISPLAY MODULE AND LED DISPLAY SYSTEM USING THE SAME

(71) Applicant: ASONE CO., LTD., Seoul (KR)

(72) Inventors: Ho Chan Yun, Seoul (KR); Tae Hyun Kwon, Seoul (KR)

(73) Assignee: ASONE CO., LTD., Seoul (KR)

( * ) Notice: Subject to any disclaimer, the term of this patent is extended or adjusted under 35 U.S.C. 154(b) by 0 days.

(21) Appl. No.: 18/625,179

(22) Filed: Apr. 2, 2024

(30) Foreign Application Priority Data

Jun. 14, 2023 (KR) ........................ 10-2023-0076378

(51) Int. Cl.
*G09G 3/32* (2016.01)

(52) U.S. Cl.
CPC ....... *G09G 3/32* (2013.01); *G09G 2320/0233* (2013.01); *G09G 2320/0242* (2013.01); *G09G 2320/041* (2013.01)

(58) Field of Classification Search
CPC ............. G09G 3/32; G09G 2320/0233; G09G 2320/0242; G09G 2320/041
See application file for complete search history.

(56) References Cited

U.S. PATENT DOCUMENTS

2014/0285477 A1* 9/2014 Cho .......................... G09G 5/02
345/207
2018/0240398 A1* 8/2018 Machida .................. G09G 3/32
2020/0111408 A1* 4/2020 Machida .............. G09G 3/2014

FOREIGN PATENT DOCUMENTS

JP 2014-048396 A 3/2014
KR 10-1374648 B1 3/2014
KR 10-1936328 B1 4/2019
KR 10-2220914 B1 2/2021
KR 10-2250585 B1 5/2021

* cited by examiner

*Primary Examiner* — Muhammad N Edun
(74) *Attorney, Agent, or Firm* — Revolution IP, PLLC

(57) ABSTRACT

A method for compensating a color change due to a temperature rise of an LED display module, includes obtaining temperature data measured for each of red, green and blue LEDs and luminance data measuring a luminance at a temperature; calculating a time constant of brightness relative to temperature of each of the red, green and blue LEDs according to a temperature change value using the temperature data and luminance data; calculating a rate of brightness at a current temperature relative to a normal temperature for each of the red, green and blue LEDs using the time constant calculated; calculating a color value with a color value conversion rate by setting, as a reference point, a rate of brightness of the red LED at a highest temperature relative to a normal temperature; and calculating a final brightness value compensated for each of the red, green and blue LEDs.

8 Claims, 4 Drawing Sheets

METHOD FOR COMPENSATING COLOR CHANGE DUE TO TEMPERATURE RISE OF LED DISPLAY MODULE AND LED DISPLAY SYSTEM USING THE SAME

BACKGROUND OF THE INVENTION

Technical Field

The present invention relates to an LED display system. More specifically, the present invention relates to a method for automatically compensating a color change when due to a temperature rise, the color change occurs in an image output to an LED display module constituting an LED display, and an LED display system using the same.

Background Art

In general, an LED display has a plurality of cabinets sequentially connected and is operated by the control of a main controller. Each cabinet comprises an LED display module, a sub-controller, a power controller, etc., and the LED display module comprises an LED device and a driver for driving the same, etc. The cabinets are connected to adjacent cabinets to implement a large-scale screen.

The LED display displays an image with full colors. The LED device used herein includes red, green, and blue LED devices. When the temperature changes, the moving speed of electrons and electron holes inside the LED changes, and accordingly, luminous efficiency changes. An LED is a semiconductor device that produces light by the recombination of electrons and electron holes and the release of energy when electricity flows through it. In this case, the heat produced by the recombination of electrons and electron holes raises the temperature of the LED.

An LED is typically operated having a higher brightness at a lower temperature, because more electron-hole carrier recombination occurs at a high temperature when electrons and electron holes are combined in a recombination layer to release photons. Accordingly, photons with high energy are absorbed by other materials or converted into photons with lower energy, thereby decreasing brightness.

The change in brightness of the LED generally ranges between −0.5 and −1.5%/° C., which means that the brightness is reduced by 0.5 to 1.5% as the temperature rises by 1° C. Additionally, compared with the green or blue LED, the red LED has the greatest brightness change rate. For example, the red LED, which has a brightness change rate of −1%/° C. and is operated with 100% brightness at 25° C., is operated with about 75% brightness at 50° C. The blue LED, which has a brightness change rate of −0.2%/° C. and is operated with 100% brightness at 25° C., is operated with about 95% brightness at 50° C.

Accordingly, in an LED display module having multiple LEDs mounted thereon, heat is generated when power is applied to the LEDs for driving, and the heat reduces brightness. In this case, each color has a different reduction rate, resulting in a change in color. By solving this problem, the LED display module should always express the same color and provide uniform image quality.

Korean Patent No. 10-2220914 discloses the technology of dividing a photographing correction image taken of an image with a correction image for compensating the color output to the LED display due to changes in the external environment inserted, into a plurality of regions for each color, comparing the color value of the divided region with the color value encoded in an identification image included in the photographing correction image to derive an adjusted color value for the corresponding color, and compensating the color value of the corresponding color output to the LED display based on the adjusted color value by a controller. According to this prior art, the color which is changed by the external environment is compensated in a manner of compensating tone or brightness of the corresponding color by deriving the correction data through the correction image and sampling information, and thus there is a limit to supplement the brightness which is reduced in the environment where a relatively high temperature continues, through the compensation of tone or brightness.

Korean Patent No. 10-1936328 discloses the technology of setting regions per cabinet, receiving red, green and blue information, respectively, and giving weights for each region to perform calibration. According to this prior art, the regions with different image qualities are set per cabinet, and thus there is a limit to correct the difference in color temperature within one LED display module due to the temperature difference.

In this regard, the present invention suggests a method for compensating a color change due to a temperature rise of an LED display module capable of preventing the color change caused due to different reduction rates per color in the LED display module, to always display the same color and provide uniform image quality in the LED display module, and an LED display system using the same.

SUMMARY OF THE INVENTION

Task to be Solved

It is an object of the present invention to provide a method for compensating a color change due to a temperature rise of an LED display module using a relationship between temperature and luminance.

It is another object of the present invention to provide an LED display system capable of automatically compensating a luminance change according to the temperature, thereby maintaining constant brightness and image quality.

The objects above and other objects inferred therein can be easily achieved by the present invention explained below.

Means for Solving Task

The method for compensating a color change due to a temperature rise of an LED display module, the method comprising: obtaining temperature data measured for each of red, green and blue LEDs and luminance data measuring a luminance at a temperature according to the temperature data; calculating a time constant of brightness relative to temperature of each of the red, green and blue LEDs according to a temperature change value using the temperature data and luminance data; calculating a rate of brightness at a current temperature relative to a normal temperature for each of the red, green and blue LEDs using the time constant calculated; calculating a color value with a color value conversion rate by setting, as a reference point, a rate of brightness of the red LED at a highest temperature relative to a normal temperature; and calculating a final brightness value compensated for each of the red, green and blue LEDs by multiplying the luminance, color value conversion rate and rate of brightness of the red LED at a normal temperature.

In the present invention, when denoting luminances of the red, green and blue LEDs at a current temperature T by Cr, Cg and Cb, respectively, denoting luminances of the red, green and blue LEDs at a normal temperature by bCr, bCg and bCb, respectively, and denoting luminances of the red, green and blue LEDs at a highest temperature MT by MCr, MCg and MCb, respectively, a temperature change value dT according to Formula 1 below may be defined $$\text{temperature change value}(dT)=\text{current temperature }(T)-\text{normal temperature}(bT),\quad \text{[Formula 1]}$$

a time constant of brightness relative to temperature αr for the red LED is calculated by Formula 2 below $$\alpha r=[(1-MCr/bCr)/dT]\times 100,\quad \text{[Formula 2]}$$

a time constant of brightness relative to temperature ag for the green LED is calculated by Formula 3 below $$\alpha g=[(1-MCg/bCg)/dT]\times 100,\text{ and}\quad \text{[Formula 3]}$$

a time constant of brightness relative to temperature ab for the blue LED is calculated by Formula 4 below $$\alpha b=[(1-MCb/bCb)/dT]\times 100.\quad \text{[Formula 4]}$$

In the present invention, rates of brightness at the current temperature relative to the normal temperature may be denoted as a rate of brightness βr of the red LED at the current temperature relative to the normal temperature according to Formula 5 below, a rate of brightness βg of the green LED at the current temperature relative to the normal temperature according to Formula 6 below, and a rate of brightness βb of the blue LED at the current temperature relative to the normal temperature according to Formula 7 below $$\beta r=100-(dT\times\alpha r)\quad \text{[Formula 5]}$$

$$\beta g=100-(dT\times\alpha g)\quad \text{[Formula 6]}$$

$$\beta b=100-(dT\times\alpha b)\quad \text{[Formula 7]}$$

rates of brightness at the highest temperature relative to the normal temperature may be denoted as a rate of brightness Mβr of the red LED at the highest temperature relative to the normal temperature according to Formula 9 below, a rate of brightness Mβg of the green LED at the highest temperature relative to the normal temperature according to Formula 10 below, and a rate of brightness Mβb of the blue LED at the highest temperature relative to the normal temperature according to Formula 11 below, using a highest temperature change value dMT defined by Formula 8 below $$\text{highest temperature change value}(dMT)=\text{highest temperature}(MT)-\text{normal temperature }(bT)\quad \text{[Formula 8]}$$

$$M\beta r=100-(dMT\times\alpha r)\quad \text{[Formula 9]}$$

$$M\beta g=100-(dMT\times\alpha g)\quad \text{[Formula 10]}$$

$$M\beta b=100-(dMT\times\alpha b)\quad \text{[Formula 11].}$$

In the present invention, the reference point may be defined as the rate of brightness Mβr of the red LED at the highest temperature relative to the normal temperature.

In the present invention, a color value conversion rate or for calculating a color value of the red LED may be defined by Formula 12 below $$\omega r=M\beta r/\beta r,\quad \text{[Formula 12]}$$

a color value conversion rate og for calculating a color value of the green LED may be defined by Formula 13 below $$\omega g=M\beta r/\beta g,\text{ and}\quad \text{[Formula 13]}$$

a color value conversion rate ωb for calculating a color value of the blue LED may be defined by Formula 14 below $$\omega b=M\beta r/\beta b\quad \text{[Formula 14.]}$$

In the present invention, when denoting an input color value of the red LED by CVri, a color value CVr of the red LED to be output may be calculated by Formula 15 below $$CVr=CVri\times\omega r=CVri\times(100-(dMT\times\alpha r))/(100-(dT\times\alpha r))\quad \text{[Formula 15]}$$

when denoting an input color value of the green LED by CVgi, a color value CVg of the green LED to be output may be calculated by Formula 16 below $$CVg=CVgi\times\omega g=CVgi\times(100-(dMT\times\alpha r))/(100-(dT\times\alpha g)),\text{ and}\quad \text{[Formula 16]}$$

when denoting an input color value of the blue LED by CVbi, a color value CVb of the blue LED to be output may be calculated by Formula 17 below $$CVb=CVbi\times\omega b=CVbi\times(100-(dMT\times\alpha r))/(100-(dT\times\alpha b)).\quad \text{[Formula 17]}$$

In the present invention, when denoting a maximum value of a full white color value by MCV, a color value CVr of the red LED may also be calculated by Formula 18 below $$CVr=MCV\times\omega r=MCV\times(100-(dMT\times\alpha r))/(100-(dT\times\alpha r)),\quad \text{[Formula 18]}$$

a color value CVg of the green LED is also calculated by Formula 19 below $$CVg=MCV\times\omega g=MCV\times(100-(dMT\times\alpha r))/(100-(dT\times\alpha g)),\text{ and}\quad \text{[Formula 19]}$$

a color value CVb of the blue LED is also calculated by Formula 20 below $$CVb=MCV\times\omega b=MCV\times(100-(dMT\times\alpha r))/(100-(dT\times\alpha b)).\quad \text{[Formula 20]}$$

In the present invention, a final brightness value LCr of the red LED may be calculated by Formula 21 below $$LCr=bCr\times\omega r\times\beta r/100,\quad \text{[Formula 21]}$$

a final brightness value LCg of the green LED is calculated by Formula 22 below $$LCg=bCg\times\omega g\times\beta g/100,\text{ and}\quad \text{[Formula 22]}$$

a final brightness value LCb of the blue LED may be calculated by Formula 23 below $$LCb=bCb\times\omega b\times\beta b/100.\quad \text{[Formula 23].}$$

An LED display system according to the present invention comprises a cabinet 10 comprising an LED display module 11 for outputting a full color image, a sub-controller unit 12 for processing and storing data, and at least one temperature sensor 13 installed in the display module 11 and/or sub-controller unit 12; a main controller unit 20 connected to a user terminal 30 via a data network to transmit a control signal to the cabinet 10 according to a signal input from the user terminal 30; a temperature measuring device 40 for measuring a temperature by heat generated from the LED display module 11 or the sub-controller unit 12, the temperature measuring device 40 being installed at one side of the cabinet 10 and connected to the user terminal 30; and a luminance measuring device 50 for measuring a luminance of the LED display module 11, the luminance measuring device 50 being installed at one side of the LED display module 11 and connected to the user terminal 30, wherein the user terminal 30 comprises a memory for storing image data for the display and other various data, and a wired/wireless communication module, stores a video or image to be output through the cabinet 10, and comprises a program for calculating a time constant of brightness relative to temperature, a rate of brightness relative to temperature, and a color value conversion rate for calculating a color value, using the measured temperature data and the luminance data according to the temperature, and storing the same in a database, the time constant of brightness relative to temperature is calculated for each of red, green and blue LEDs according to a temperature change value using temperature data measured for each of the red, green and blue LEDs installed in the LED display module and luminance data measuring a luminance at a temperature according to the temperature data, the rate of brightness relative to temperature is calculated for each of the red, green and blue LEDs, of a rate of brightness at a current temperature relative to a normal temperature using the time constant of brightness relative to temperature, the color value conversion rate is calculated by setting, as a reference point, a rate of brightness of the red LED at a highest temperature relative to a normal temperature, and a final brightness value compensated for each of the red, green and blue LEDs is calculated by multiplying the luminance, color value conversion rate, and rate of brightness of the red LED at a normal temperature.

In the present invention, the user terminal 30 may be a person computer (PC), a tablet computer, or a smart phone to be used by a user or a manager.

In the present invention, temperature data measured by the temperature measuring device 40 and temperature data measured by the temperature sensor 13 installed in the sub-controller unit 12 may be stored in a memory of the user terminal 30, a memory of the main controller 20 or a memory of the sub-controller unit 12, or stored in a separate storage device via a network.

Effect of the Invention

The present invention has an effect of providing a method for compensating a color change due to a temperature rise of an LED display module using a relationship between temperature and luminance, and an LED display system capable of maintaining constant brightness and image quality by automatically compensating a luminance change according to the temperature.

Hereinafter, the present invention will be explained in detail with reference to the accompanying drawings.

DETAILED DESCRIPTION OF THE INVENTION

Figure 1:
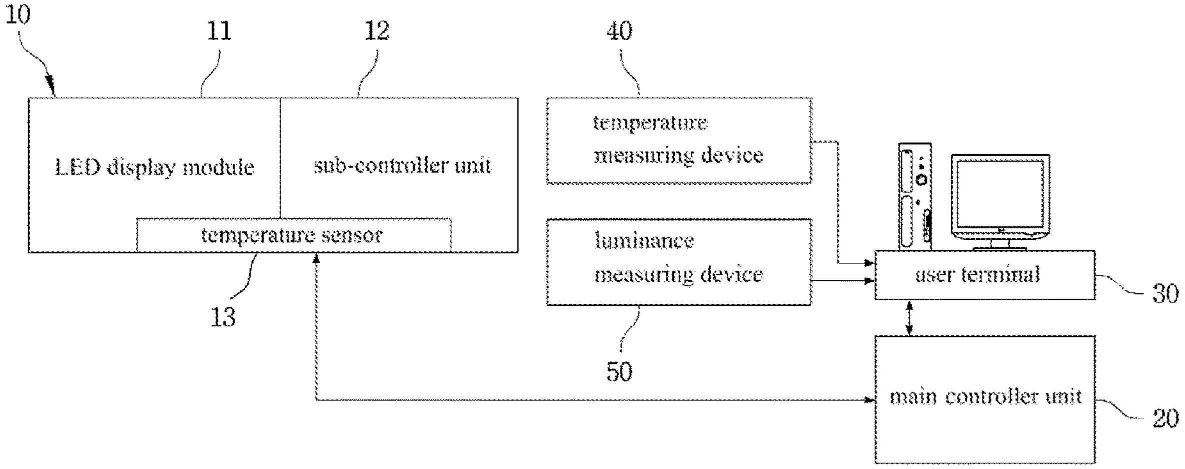
FIG. 1 is a conceptual diagram of an LED display system for compensating a color change due to a temperature rise of an LED display module according to a first embodiment of the present invention.

FIG. 1 is a conceptual diagram of an LED display system for compensating a color change due to a temperature rise of an LED display module according to a first embodiment of the present invention. As illustrated in FIG. 1, the system 100 for compensating a color change due to a temperature rise of an LED display module according to an embodiment of the present invention comprises a cabinet 10, a main controller unit 20, a user terminal 30, a temperature measuring device 40, and a luminance measuring device 50.

The cabinet 10 comprises an LED display module 11 for outputting a full color image, a sub-controller unit 12 for controlling the cabinet 10 and processing and storing data, and a temperature sensor 13. The LED display module 11 comprises an LED device, a substrate, an LED drive circuit, etc. The sub-controller unit 12 comprises a communication module for communicating data with a processor for processing data, the temperature sensor 13 or the main controller unit 20, etc., a memory for storing various data, etc.

The temperature sensor 13 may include at least two temperature sensors, and is installed in the sub-controller unit 12 and/or the LED display module 11 of the cabinet 10 to measure a current temperature and a maximum temperature after a certain time of operation.

The main controller unit 20 transmits a control signal to the cabinet 10 according to a signal input from the user terminal 30. To this end, the main controller unit 20 is connected to the user terminal 30 via a serial communication interface or data network. In the present invention, the serial communication interface may be any one of RS232, RS422, RS485, Serial Peripheral Interface (SPI) and Controller Area Network (CAN), and the data network may be any one of Local Area Network (LAN), Wide Area Network (WAN), Metropolitan Area Network (MAN), Virtual Private Network (VPN) and Wireless Network.

The user terminal 30 is generally used by a user or manager, and may be a personal computer (PC), a tablet computer, a smart phone, etc. The user terminal 30 comprises a memory for storing image data for the display and other various data, and a wired/wireless communication module. The user terminal 30 performs data communication with the main controller unit 20. The user terminal 30 stores a video or image to be output through the cabinet 10, and stores a program outputting the same. Such programs may be provided in the sub-controller unit 12 or main controller unit 20.

In addition, the user terminal 30 comprises a program for calculating a time constant of brightness relative to temperature, a rate of brightness relative to temperature, a color value conversion rate for calculating a color value, etc., and storing the same in the database, using the measured temperature data and luminance data according to the temperature. Such programs may be provided in the user terminal 30, or may be provided in the sub-controller unit 12 or main controller unit 20.

The temperature measuring device 40 is installed at one side of the cabinet 10 and connected to the user terminal 30 to measure a temperature by the heat generated from the LED display module 11 or the sub-controller unit 12. The temperature measuring device 40 may be an infrared sensor or an infrared thermometer for measuring a temperature. The temperature data measured by the temperature measuring device 40 and the temperature data measured by the temperature sensor 13 installed in the sub-controller unit 10 may be stored in a memory of the user terminal 30, a memory of the main controller 20, or a memory of the sub-controller unit 12, or may be stored in a separate storage device via a network, e.g., a cloud, a database server, etc.

The luminance measuring device 50, which is a device for quantitatively measuring a luminance, i.e., intensity of light, in the physical aspect, is installed at one side of the LED display module 11 for measuring the luminance of the LED display module 11 of the cabinet 10 and connected to the user terminal 30 so that the measured luminance data is transmitted to the user terminal 30.

FIG. 1 illustrates one cabinet 10. However, in a real LED display system, a plurality of cabinets 10 may be sequentially connected to each other to implement a large-scale screen.

Figure 2:
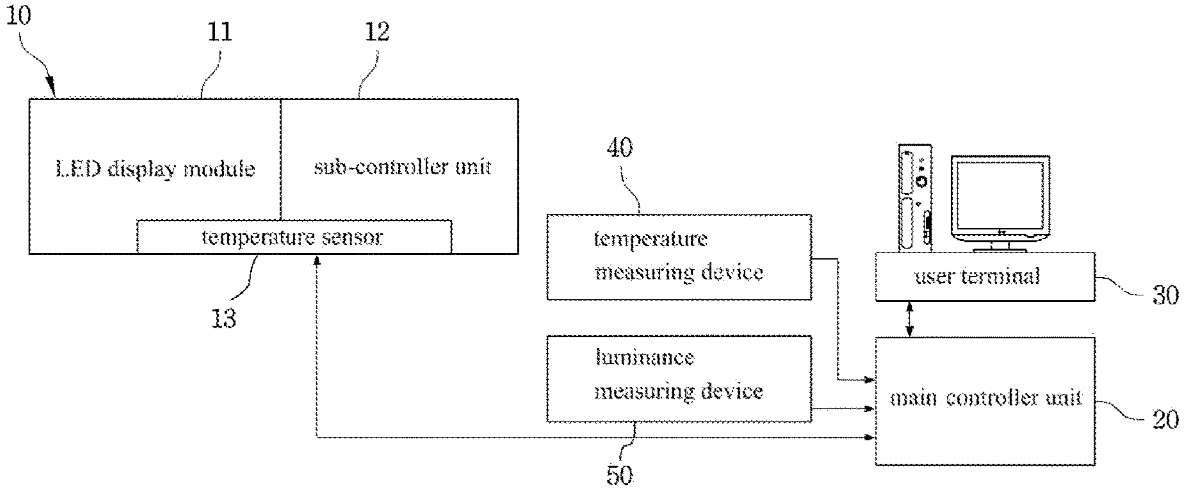
FIG. 2 is a conceptual diagram of an LED display system for compensating a color change due to a temperature rise of an LED display module according to a second embodiment of the present invention.

FIG. 2 is a conceptual diagram of an LED display system 200 for compensating a color change due to a temperature rise of an LED display module 10 according to a second embodiment of the present invention. As illustrated in FIG. 2, the LED display system 200 according to the second embodiment of the present invention comprises a cabinet 10, a main controller unit 20, a user terminal 30, a temperature measuring device 40 and a luminance measuring device 50. The LED display system 200 is different from the LED display system 100 according to the first embodiment in that the temperature measuring device 40 and the luminance measuring device 50 are connected to the main controller unit 20, not to the user terminal 30. In this case, the user terminal 30 provides a user interface to the user or manger, to control the main controller unit 20 therethrough to perform calculation for compensating a color change and display the compensated screen.

The temperature measuring device 40 may be omitted in the second embodiment of the present invention. In this case, a temperature value measured by a temperature sensor 13 installed in a sub-controller unit 12 may be used. The temperature sensor 13 is installed in each of a portion of high temperature and a portion of low temperature, to sense a difference in temperature between the two portions and perform calculation for displaying the compensated screen.

Figure 3:
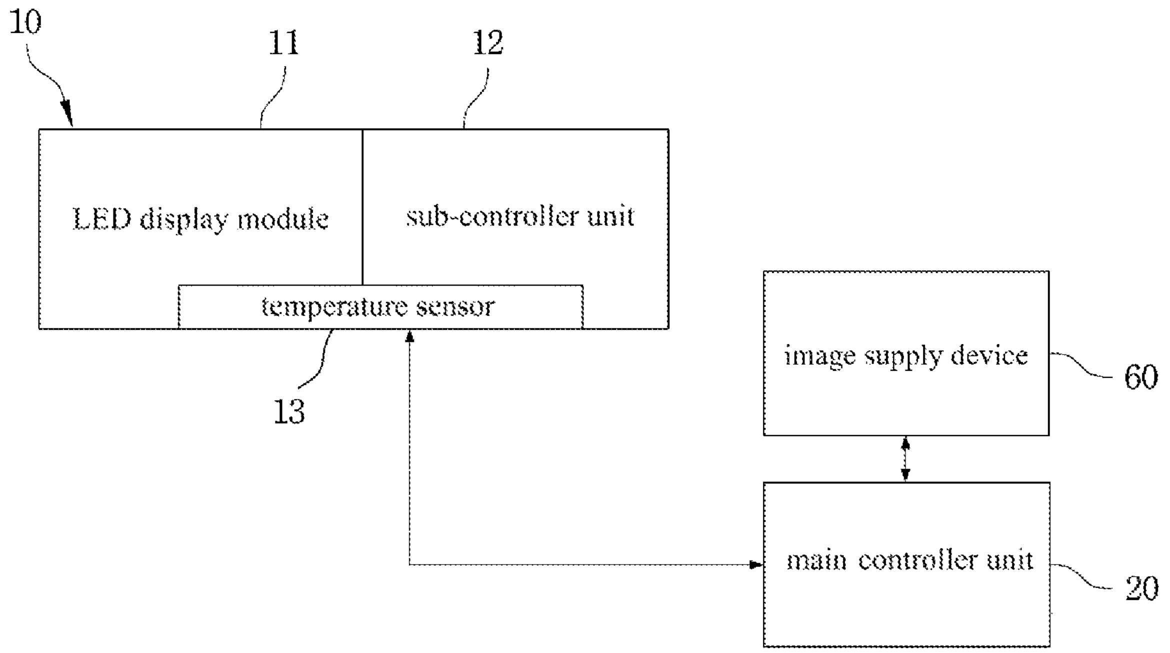
FIG. 3 is conceptual diagram of an LED display system for compensating a color change due to a temperature rise of an LED display module according to a third embodiment of the present invention.

FIG. 3 is conceptual diagram of an LED display system 300 for compensating a color change due to a temperature rise of an LED display module 11 according to a third embodiment of the present invention. Referring to FIG. 3, the LED display system 300 according to the third embodiment of the present invention comprises a cabinet 10, a main controller unit 20, and an image supply device 60.

The image supply device 60 may be a personal computer (PC), a Blu-ray player, a media server, etc., which stores an image to be output through the cabinet 10.

In the third embodiment of the present invention, a temperature measuring device and a luminance measuring device are not installed. Instead, the temperature data measured by the temperature sensor 13 of the cabinet 10, the luminance data measured in the first or second embodiment of the present invention, and the luminance data estimated from a vast amount of data on the calculated time constant, the color value conversion rate, the rate of brightness, etc. databased through mechanical learning may be used to display the compensated screen.

Figure 4:
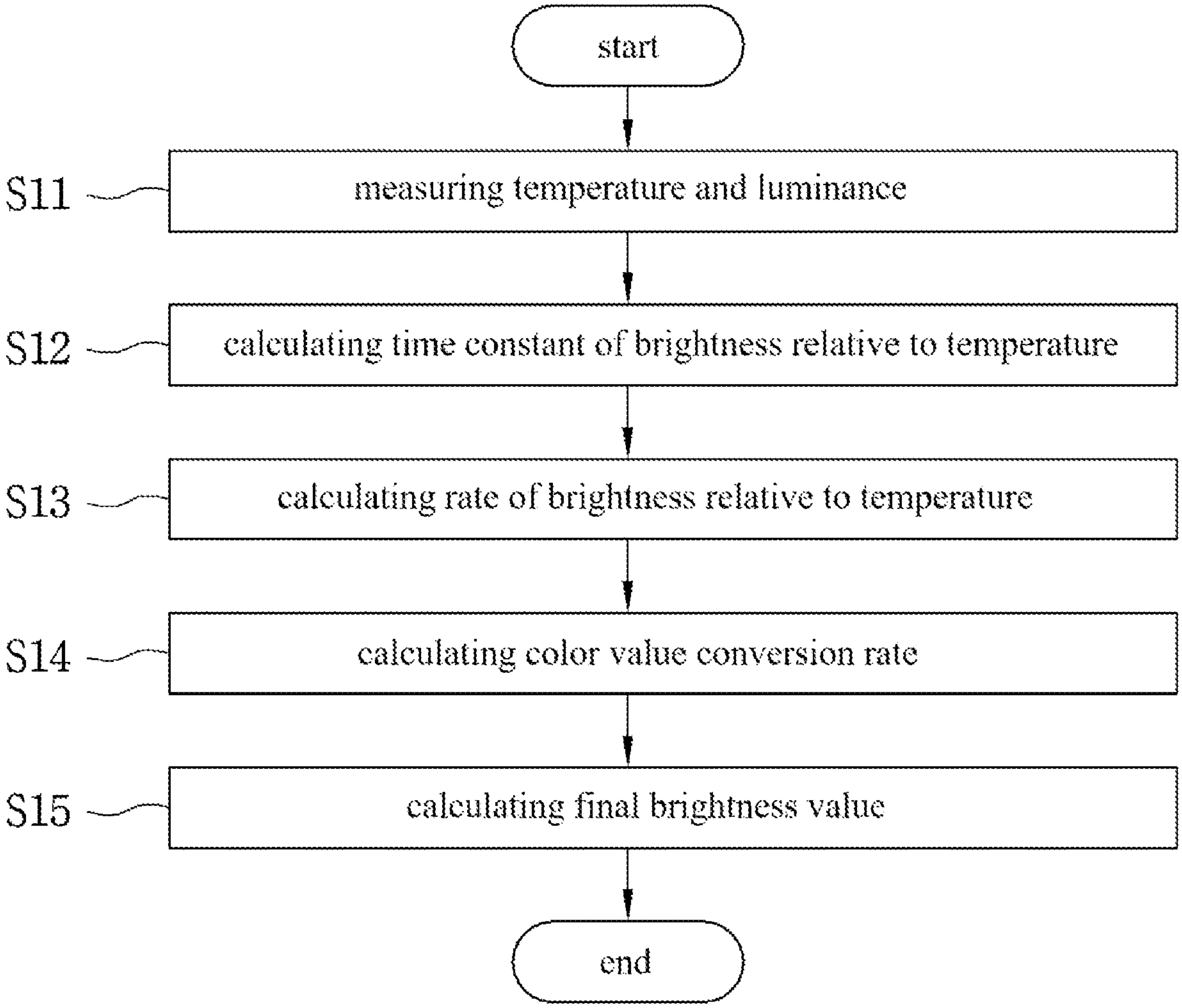
FIG. 4 is a flow chart illustrating a method for compensating a color change due to a temperature rise of an LED display module according to the present invention.

FIG. 4 is a flow chart illustrating a method for compensating a color change due to a temperature rise of an LED display module according to the present invention.

In order to compensate a change in color temperature according to the temperature, the present invention first measures temperature and luminance, databases a relationship between the measured temperature and luminance, performs calculation on compensation, and outputs an image with a compensated color change to an LED display module.

Step S11: Measuring Temperature and Luminance

Step 11 is a step of measuring a temperature by a temperature sensor or temperature measuring device and measuring a luminance at the corresponding temperature by a luminance measuring device to database the brightness of each of red, green and blue LEDs. As used herein, brightness means luminance, and the unit of luminance is $mcd/m^{2\cdot\circ}$ C. The luminance C at the current temperature T, the luminance bC at the normal temperature bT, and the luminance MC at the highest temperature MT are measured. The measured temperature data and luminance data are stored in the database.

Step S12: Calculating Time Constant of Brightness Relative to Temperature

At the current temperature T, the luminances of red, green and blue LEDs are denoted by Cr, Cg, Cb, respectively. At the normal temperature, the luminance of the red LED is denoted by bCr, the luminance of the green LED is denoted by bCg, and the luminance of the blue LED is denoted by bCb. At the highest temperature MT, the luminance of the red LED is denoted by MCr, the luminance of the green LED is denoted by MCg, and the luminance of the blue LED is denoted by MCb. With these measured values, time constants of brightness relative to temperature αr, αg and αb of the red, green and blue LEDs according to a temperature change value calculated by Formula 1 are calculated by Formulae 2 to 4 below. The calculated time constants of brightness relative to temperature are also stored in the database.

$$\text{temperature change value}(dT)=\text{current temperature}(T)-\text{normal temperature}(bT) \quad \text{[Formula 1]}$$

$$\alpha r=[(1-MCr/bCr)/dT]\times 100 \quad \text{[Formula 2]}$$

$$\alpha g=[(1-MCg/bCg)/dT]\times 100 \quad \text{[Formula 3],}$$

$$\alpha b=[(1-MCb/bCb)/dT]\times 100 \quad \text{[Formula 4]}$$

Step S13: Calculating Rate of Brightness Relative to Temperature

A rate of brightness β at the current temperature relative to the normal temperature is calculated by using the calculated time constant. The rates of brightness of the red, green and blue LEDs are denoted by βr, βg and βb, respectively, and calculated by Formulae 5 to 7 below.

$$\beta r=100-(dT\times\alpha r) \quad \text{[Formula 5]}$$

$$\beta g=100-(dT\times\alpha g) \quad \text{[Formula 6]}$$

$$\beta b=100-(dT\times\alpha b) \quad \text{[Formula 7]}$$

The rates of brightness Mβs at the highest temperature relative to the normal temperature are denoted by Mβr, Mβg and Mβb, respectively, for the red, green and blue LEDs according to a highest temperature change value dMT defined in Formula 8 below, and calculated by Formulae 9 to 11 below.

$$\text{highest temperature change value}(dMT)=\text{highest temperature}(MT)-\text{normal temperature}(bT) \quad \text{[Formula 8]}$$

$$M\beta r=100-(dMT\times\alpha r) \quad \text{[Formula 9]}$$

$$M\beta g=100-(dMT\times\alpha g) \quad \text{[Formula 10]}$$

$$M\beta b=100-(dMT\times\alpha b) \quad \text{[Formula 11]}$$

Step S14: Calculating Color Value Conversion Rate

At the highest temperature, the color of red LED is most reduced. Accordingly, the color values are calculated by setting, as a reference point, the rate of brightness Mβr of the red LED at the highest temperature relative to the normal temperature. In this case, a color value conversion rate or for calculating a color value of the red LED is defined by Formula 12 below.

$$\omega r=M\beta r/\beta r \quad \text{[Formula 12]}$$

A color value conversion rate ωg for calculating a color value of the green LED is defined by Formula 13 below.

$$\omega g=M\beta r/\beta g \quad \text{[Formula 13]}$$

A color value conversion rate ωb for calculating a color value of the blue LED is defined by Formula 14 below.

$$\omega b=M\beta r/\beta b \quad \text{[Formula 14]}$$

Accordingly, when denoting an input color value of the red LED by CVri, a color value CVr of the red LED to be output is calculated by Formula 15 below.

$$CVr=CVri\times\omega r=CVri\times(100-(dMT\times\alpha r))/(100-(dT\times\alpha r)) \quad \text{[Formula 15]}$$

When denoting an input color value of the green LED by CVgi, a color value CVg of the green LED to be output is calculated by Formula 16 below.

$$CVg=CVgi\times\omega g=CVgi\times(100-(dMT\times\alpha r))/(100-(dT\times\alpha g)) \quad \text{[Formula 16]}$$

When denoting an input color value of the blue LED by CVbi, a color value CVb of the blue LED to be output is calculated by Formula 17 below.

$$CVb=CVbi\times\omega b=CVbi\times(100-(dMT\times\alpha r))/(100-(dT\times\alpha b)) \quad \text{[Formula 17]}$$

In order for an LED device to have full white color, all the three colors of red, green and blue should be set to the maximum. In this case, when a maximum value of a full white color value is denoted by MCV, MCV is 255 in 8 bit color, and MCV is 1023 in 10 bit color. The color values CVr, CVg and CVb of the red, green and blue LEDs may be calculated respectively by Formulae 18 to 20 below, using MCV.

$$CVr=MCV\times\omega r=MCV\times(100-(dMT\times\alpha r))/(100-(dT\times\alpha r)) \quad \text{[Formula 18]}$$

$$CVg=MCV\times\omega g=MCV\times(100-(dMT\times\alpha r))/(100-(dT\times\alpha g)) \quad \text{[Formula 19]}$$

$$CVb=MCV\times\omega b=MCV\times(100-(dMT\times\alpha r))/(100-(dT\times\alpha b)) \quad \text{[Formula 20]}$$

The database on the obtained color value, color value conversion rate, and previously measured temperature, luminance and rate of brightness may be created. In order to compensate a change in brightness according to the temperature, a system for controlling to transmit a brightness value compensated using such database to the LED display module is necessary. The present invention provides such a system along with the method for compensating brightness according to a color change.

Step S15: Calculating Compensated Final Brightness Value

A final brightness value LCr of the red LED actually output using the databased color value conversion rate, rate of brightness and luminance may be obtained by Formula 21 below.

$$LCr=bCr\times\omega r\times\beta r/100 \quad \text{[Formula 21]}$$

A final brightness value LCg of the green LED is calculated by Formula 22 below $$LCg=bCg\times\omega g\times\beta g/100 \quad \text{[Formula 22]}$$

A final brightness value LCb of the blue LED may be calculated by Formula 23 below $$LCb=bCb\times\omega b\times\beta b/100 \quad \text{[Formula 23].}$$

The colors having the same brightness all the time may be output to the LED display module from the calculations, regardless of a temperature change.

The normal temperature bT may be 20° C. Due to the characteristics of the LED display system, once starting operation, the LED display system may maintain a surface temperature of 20° C. within a short time even at 20° C. or lower.

The database is constructed with the normal temperature of 20° C. by measuring the temperature at a highest point of the LED display module, and calculating a time constant according to the temperature change. For example, assuming that the LED display module operates at a temperature ranging between 20 and 50° C., which means that the highest temperature is 50° C., the cycle of increase and decrease of brightness relative to temperature may be the databased through mechanical learning with MT=50.

In case where the red LED has −1 $mcd/m^{2}\cdot$° C., the green LED has −0.2 $mcd/m^{2}\cdot$° C., and the blue LED has −0.1 $mcd/m^{2}\cdot$° C., when the red LED shows 100% brightness at the normal temperature 20° C., it shows 70% brightness at the highest temperature 50° C. In this case, a time constant for reduction of brightness is obtained with the brightness at 50° C. as a standard value, and then a color value is calculated and databased.

Figure 5:
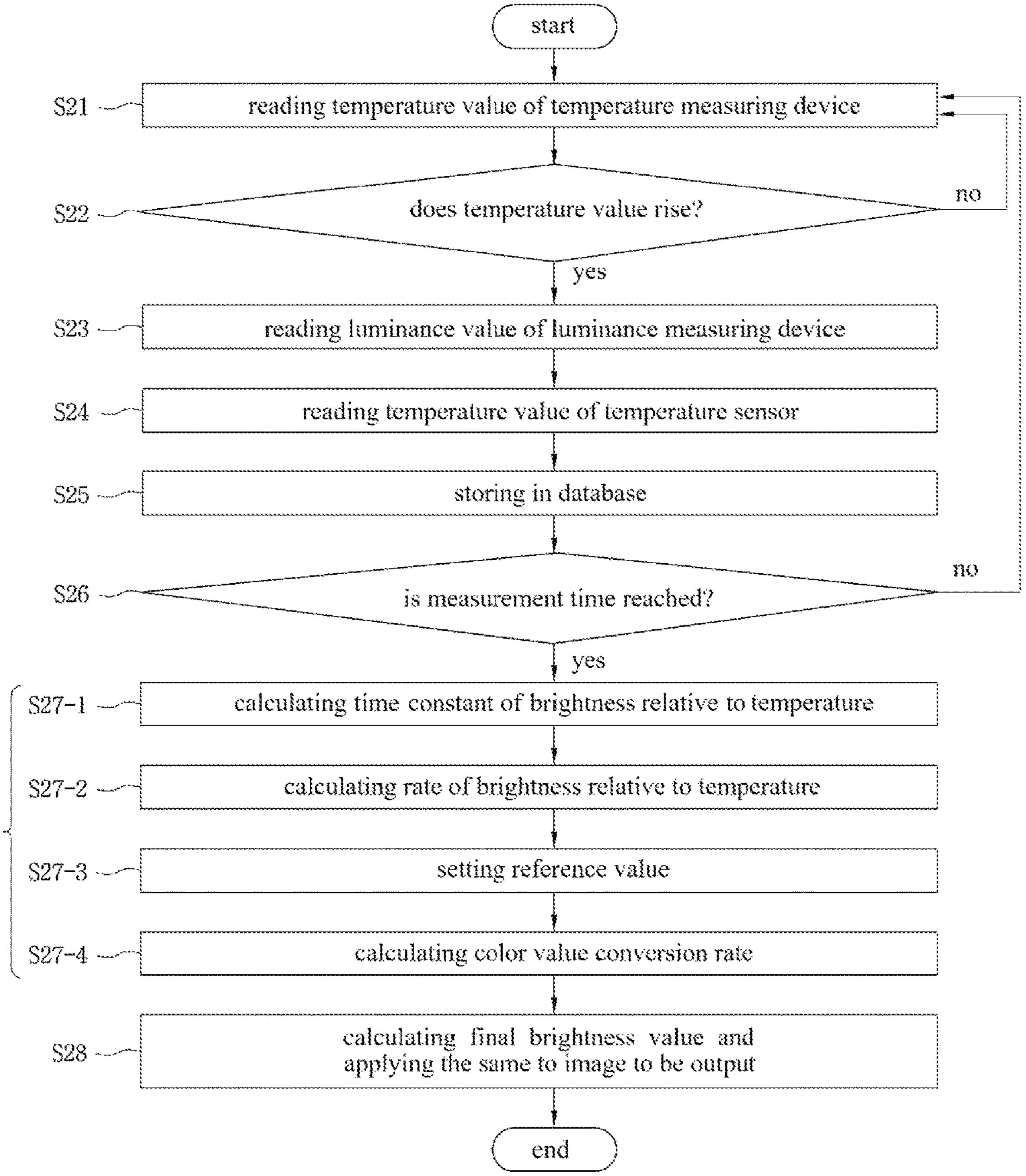
FIG. 5 is a flow chart illustrating an example of a data processing process of an LED display system to which the method for compensating a color change due to a temperature rise of an LED display module according to the present invention is applied.

FIG. 5 is a flow chart illustrating an example of a data processing process of an LED display system to which the method for compensating a color change due to a temperature rise of an LED display module 11 according to the present invention is applied.

As illustrated in FIG. 5, the LED display system according to the present invention reads a temperature value of the temperature measuring device 40 in step S21.

In next step S22, it is checked whether the temperature value read rises, and if the temperature value does not rise, go back to step S21 to read a temperature value.

If the temperature value rises, luminance values of the respective red, green and blue LEDs measured by the luminance measuring device 50 are read in next step S23.

In step S24, a temperature value measured by the temperature sensor installed in the sub-controller unit 12 of the cabinet 10 is read.

In step S25, the temperature value and luminance value are stored in the database, and in step S26, it is determined whether a measurement time for measuring the temperature and luminance reaches a predetermined value. For example, if the measurement time is set as 1 hour, steps S21 to S26 are repeated until reaching 1 hour. When the measurement time is reached, proceed with step S27.

In step S27, color value conversion rates of red, green and blue according to the temperature are respectively calculated.

To this end, in step S27-1, a time constant of brightness relative to temperature is calculated by using the normal temperature, current temperature, temperature change value, and luminance value at the corresponding temperature within the measurement time.

In next step S27-2, a rate of brightness at the current temperature relative to the normal temperature, and a rate of brightness at the highest temperature relative to the normal temperature are calculated by using the time constant of brightness relative to temperature calculated in step S27-1.

In step S27-3, a color value of the red LED at the highest temperature is set as a reference value.

In step S27-4, a color value conversion rate of each color is calculated and stored in the database for calculating a color value of each of the red, green and blue LEDs using the reference value.

In step S28, a color value is calculated by using the color value conversion rate, and a final brightness value for each color is applied. When a program for compensating the color change is driven in the user terminal 30, the program calculates the final brightness value, and a result value is transmitted to the main controller unit 20 to control a final output image.

When the main controller unit 20 or sub-controller unit 12, not the user terminal 30, performs calculation for compensating the color change, the calculated compensation value is stored in a memory of the corresponding controller, thereby controlling to apply the compensated brightness value to a final image.

In step S29, the final image is output by a control signal according to the final brightness value compensated.

In the present invention, heat sources generated from the LED module 11 include heat generated from the LED device itself and heat generated from an integrated circuit including an LED driver of the LED module. The heat is dispersed into the entire LED module 11, and the temperature of the LED module does not entirely rise in balance, but in some portions, the temperature may rise a lot, whereas in other portions, the temperature may not.

In such a case, a temperature sensor is installed in each of a portion of high temperature and a portion of low temperature, and a temperature difference between the two portions may be applied to the calculation of the final brightness value.

Once the calculated data is collected and databased, the calculation data according to the temperature difference is accumulated, and thus the temperature difference can be predicted through mechanical learning based thereon. Accordingly, the temperature difference can be predicted using only one temperature sensor.

The portion of low temperature in the LED module is defined as a first region, the portion of highest temperature is defined as a third region, and a middle region between the first region and the third region is defined as a second region. With a temperature change value using the temperature difference between the first region and the third region, a brightness value of the output image of the LED display module 11 may be compensated.

The detailed description of the present invention described as above simply explains examples for understanding the present invention, but does not intend to limit the scope of the present invention. The scope of the present invention is defined by the accompanying claims.

Additionally, it should be construed that simple modifications or changes of the present invention fall within the scope of the present invention.

The invention claimed is:

1. A method for compensating a color change due to a temperature rise of an LED display module, comprising:

obtaining temperature data measured for each of red, green and blue LEDs and luminance data measuring a luminance at a temperature according to the temperature data;

calculating a time constant of brightness relative to temperature of each of the red, green and blue LEDs according to a temperature change value using the temperature data and luminance data;

calculating a rate of brightness at a current temperature relative to a normal temperature for each of the red, green and blue LEDs using the time constant calculated;

calculating a color value with a color value conversion rate by setting, as a reference point, a rate of brightness of the red LED at a highest temperature relative to a normal temperature; and calculating a final brightness value compensated for each of the red, green and blue LEDs by multiplying the luminance, color value conversion rate and rate of brightness of the red LED at a normal temperature, wherein when denoting luminances of the red, green and blue LEDs at a current temperature T by Cr, Cg and Cb, respectively, denoting luminances of the red, green and blue LEDs at a normal temperature by bCr, bCg and bCb, respectively, and denoting luminances of the red, green and blue LEDs at a highest temperature MT by MCr, MCg and MCb, respectively, a temperature change value dT according to Formula 1 below is defined $$\text{temperature change value}(dT)=\text{current temperature }(T)-\text{normal temperature}(bT), \quad \text{[Formula 1]}$$

a time constant of brightness relative to temperature αr for the red LED is calculated by Formula 2 below $$\alpha r=[(1-MCr/bCr)/dT]\times 100, \quad \text{[Formula 2]}$$

a time constant of brightness relative to temperature ag for the green LED is calculated by Formula 3 below $$\alpha g=[(1-MCg/bCg)/dT]\times 100, \text{ and} \quad \text{[Formula 3]}$$

a time constant of brightness relative to temperature ab for the blue LED is calculated by Formula 4 below $$\alpha b=[(1-MCb/bCb)/dT]\times 100. \quad \text{[Formula 4]}$$

2. The method of claim 1, wherein rates of brightness at the current temperature relative to the normal temperature are denoted as a rate of brightness βr of the red LED at the current temperature relative to the normal temperature according to Formula 5 below, a rate of brightness βg of the green LED at the current temperature relative to the normal temperature according to Formula 6 below, and a rate of brightness βb of the blue LED at the current temperature relative to the normal temperature according to Formula 7 below $$\beta r=100-(dT\times\alpha r) \quad \text{[Formula 5]}$$

$$\beta g=100-(dT\times\alpha g) \quad \text{[Formula 6]}$$

$$\beta b=100-(dT\times\alpha b), \text{ and} \quad \text{[Formula 7]}$$

rates of brightness at the highest temperature relative to the normal temperature are denoted as a rate of brightness Mβr of the red LED at the highest temperature relative to the normal temperature according to Formula 9 below, a rate of brightness Mβg of the green LED at the highest temperature relative to the normal temperature according to Formula 10 below, and a rate of brightness Mβb of the blue LED at the highest temperature relative to the normal temperature according to Formula 11 below, using a highest temperature change value dMT defined by Formula 8 below $$\text{highest temperature change value}(dMT)=\text{highest temperature}(MT)-\text{normal temperature }(bT) \quad \text{[Formula 8]}$$

$$M\beta r=100-(dMT\times\alpha r) \quad \text{[Formula 9]}$$

$$M\beta g=100-(dMT\times\alpha g) \quad \text{[Formula 10]}$$

$$M\beta b=100-(dMT\times\alpha b). \quad \text{[Formula 11]}$$

3. The method of claim 2, wherein the reference point is the rate of brightness Mβr of the red LED at the highest temperature relative to the normal temperature.

4. The method of claim 3, wherein a color value conversion rate ωr for calculating a color value of the red LED is defined by Formula 12 below $$\omega r=M\beta r/\beta r; \quad \text{[Formula 12]}$$

a color value conversion rate ωg for calculating a color value of the green LED is defined by Formula 13 below $$\omega g=M\beta r/\beta g,\text{ and} \quad \text{[Formula 13]}$$

a color value conversion rate ωb for calculating a color value of the blue LED is defined by Formula 14 below $$\omega b=M\beta r/\beta b. \quad \text{[Formula 14]}$$

5. The method of claim 4, wherein when denoting an input color value of the red LED by CVri, a color value CVr of the red LED to be output is calculated by Formula 15 below $$CVr=CVri\times\omega r=CVri\times(100-(dMT\times\alpha r))/(100-(dT\times\alpha r)) \quad \text{[Formula 15]}$$

when denoting an input color value of the green LED by CVgi, a color value CVg of the green LED to be output is calculated by Formula 16 below $$CVg=CVgi\times\omega g=CVgi\times(100-(dMT\times\alpha r))/(100-(dT\times\alpha g)),\text{ and} \quad \text{[Formula 16]}$$

when denoting an input color value of the blue LED by CVbi, a color value CVb of the blue LED to be output is calculated by Formula 17 below $$CVb=CVbi\times\omega b=CVbi\times(100-(dMT\times\alpha r))/(100-(dT\times\alpha b)). \quad \text{[Formula 17]}$$

6. The method of claim 5, wherein when denoting a maximum value of a full white color value by MCV, a color value CVr of the red LED is also calculated by Formula 18 below $$CVr=MCV\times\omega r=MCV\times(100-(dMT\times\alpha r))/(100-(dT\times\alpha r)), \quad \text{[Formula 18]}$$

a color value CVg of the green LED is also calculated by Formula 19 below $$CVg=MCV\times\omega g=MCV\times(100-(dMT\times\alpha r))/(100-(dT\times\alpha g)),\text{ and} \quad \text{[Formula 19]}$$

a color value CVb of the blue LED is also calculated by Formula 20 below $$CVb=MCV\times\omega b=MCV\times(100-(dMT\times\alpha r))/(100-(dT\times\alpha b)). \quad \text{[Formula 20]}$$

7. The method of claim 6, wherein a final brightness value LCr of the red LED is calculated by Formula 21 below $$LCr=bCr\times\omega r\times\beta r/100, \quad \text{[Formula 21]}$$

a final brightness value LCg of the green LED is calculated by Formula 22 below $$LCg=bCg\times\omega g\times\beta g/100,\text{ and} \quad \text{[Formula 22]}$$

a final brightness value LCb of the blue LED is calculated by Formula 23 below $$LCb=bCb\times\omega b\times\beta b/100. \quad \text{[Formula 23]}$$

8. The method of claim 5, wherein a final brightness value LCr of the red LED is calculated by Formula 21 below $$LCr=bCr\times\omega r\times\beta r/100, \quad \text{[Formula 21]}$$

a final brightness value LCg of the green LED is calculated by Formula 22 below $$LCg=bCg\times\omega g\times\beta g/100,\text{ and} \quad \text{[Formula 22]}$$

a final brightness value LCb of the blue LED is calculated by Formula 23 below $$LCb=bCb\times\omega b\times\beta b/100. \quad \text{[Formula 23]}$$

* * * * *